(12) United States Patent
Li et al.

(10) Patent No.: US 10,601,515 B2
(45) Date of Patent: Mar. 24, 2020

(54) METHOD FOR SWITCHING MODULATION FORMAT OF PASSIVE OPTICAL NETWORK, APPARATUS, AND SYSTEM

(71) Applicant: HUAWEI TECHNOLOGIES CO., LTD., Shenzhen, Guangdong (CN)

(72) Inventors: Shengping Li, Wuhan (CN); Zhicheng Ye, Wuhan (CN); Xuming Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/054,388

(22) Filed: Aug. 3, 2018

(65) Prior Publication Data

US 2018/0343065 A1    Nov. 29, 2018

Related U.S. Application Data

(63) Continuation of application No. PCT/CN2016/073682, filed on Feb. 5, 2016.

(51) Int. Cl.
  *H04B 10/516* (2013.01)
  *H04B 10/27* (2013.01)
  *H04Q 11/00* (2006.01)

(52) U.S. Cl.
  CPC .......... *H04B 10/516* (2013.01); *H04B 10/27* (2013.01); *H04Q 11/0005* (2013.01);
  (Continued)

(58) Field of Classification Search
  None
  See application file for complete search history.

(56) References Cited

U.S. PATENT DOCUMENTS

| 8,385,751 | B2 | 2/2013 | Lyubomirsky |
| 2007/0140694 | A1* | 6/2007 | Choi ............... H04J 3/1694 398/71 |

(Continued)

FOREIGN PATENT DOCUMENTS

| CN | 101674501 A | 3/2010 |
| CN | 102098105 A | 6/2011 |

(Continued)

OTHER PUBLICATIONS

Kanonakis, "An Overview of MAC Issues in OFDMA-PON Networks", 2011, 13th International Conference on Transparent Optical Networks, ICTON, pp. 1-4 (Year: 2011).*

(Continued)

*Primary Examiner* — David W Lambert
(74) *Attorney, Agent, or Firm* — Womble Bond Dickinson (US) LLP

(57) ABSTRACT

Embodiments of the present invention disclose a method for switching a modulation format of a passive optical network, an apparatus, and a system. The method includes: separately delivering, by an OLT, a registration message to an optical network unit in all supported upstream modulation formats and/or downstream modulation formats; receiving, by the OLT, a first message reported by the optical network unit, where the first message includes an upstream modulation format capability and/or a downstream modulation format capability; and determining, by the OLT, a target upstream modulation format and/or a target downstream modulation format of the optical network unit according to the first message, and instructing the optical network unit to switch to the target upstream modulation format and/or the target downstream modulation format. Therefore, in a PON system that supports a plurality of modulation formats, a modulation format reporting capability of the ONU is improved.

20 Claims, 10 Drawing Sheets

(52) U.S. Cl.
CPC . *H04Q 11/0067* (2013.01); *H04Q 2011/0045* (2013.01); *H04Q 2011/0079* (2013.01)

(56) References Cited

U.S. PATENT DOCUMENTS

| | | |
|---|---|---|
| 2009/0110392 A1 | 4/2009 | Walid |
| 2011/0026917 A1* | 2/2011 | Li .................... H04W 76/19 398/1 |
| 2014/0294388 A1 | 10/2014 | Odaka et al. |
| 2014/0328593 A1* | 11/2014 | Lamb .................. H04B 10/27 398/66 |

FOREIGN PATENT DOCUMENTS

| | | |
|---|---|---|
| CN | 103607246 A | 2/2014 |
| CN | 104639467 A | 5/2015 |

OTHER PUBLICATIONS

XP31911823.Konstantinos Kanonakis:"An overview of MAC issues in OFDMA-PON networks", 2011 13th International Conference on Transparent Optical Networks,ICTON.Jun. 2011. Total 4 pages.

XP32724078.Wansu Lim et al. MAC protocol designs for OFDMA-PONs. 2014 14th International Symposium on Communications and Information Technologies (ISCIT).Sep. 2014.pp. 419-423.

XP31733123.Konstantinos Kanonakis et al. Accordance: A novel OFDMA-PON paradigm for ultra-high capacity converged wireline-wireless access networks. 2010 12th International Conference on Transparent Optical Networks. Jun. 2010. total 4 pages.

* cited by examiner

METHOD FOR SWITCHING MODULATION FORMAT OF PASSIVE OPTICAL NETWORK, APPARATUS, AND SYSTEM

CROSS-REFERENCE TO RELATED APPLICATIONS

This application is a continuation of International Application No. PCT/CN2016/073682, filed on Feb. 5, 2016, the disclosure of which is hereby incorporated by reference in its entirety.

TECHNICAL FIELD

The present invention relates to the communications field, and in particular, to a method for switching a modulation format of a passive optical network, an apparatus, and a system.

BACKGROUND

Large-scale deployment of fiber to the home (FTTH) is accompanied with an increase in bandwidth requirements of optical access. Currently, a PON (Passive Optical Network) technology is mainly used for optical access. The passive optical network (PON) technology is a point-to-multipoint fiber transmission and access technology. A broadcast manner is used downstream, and a time division multiple access (TDMA) manner is used upstream. A topology structure such as a tree type, a star type, or a bus type may be flexibly formed. No node device is required at an optical branch point, and only one simple optical splitter needs to be installed. FIG. 1 is a schematic diagram of a tree topology structure commonly used in an existing PON, including an optical line terminal (OLT) 101 on an office side, an optical network unit (ONU) or an optical network terminal (ONT) 103 on a user side, and an optical distribution network (ODN) 102. The "passive" means that the ODN does not include any active electronic component or electronic power supply, and includes only a passive component such as an optical splitter. In a PON system, transmission from an OLT to an ONU is a downstream direction, and transmission from an ONU to an OLT is an upstream direction.

At a current stage, there are various PON technologies, such as a GPON (Gigabit-Capable PON) and an EPON (Ethernet Passive Optical Network). For the current GPON or EPON network, when single-channel transmission exceeds 10 Gb/s, bandwidth efficiency of the GPON or EPON network is relatively low if non-return to zero (NRZ) code is still used. Further, in optical communications, when an NRZ encoding rate exceeds 10 Gb/s, dispersion of NRZ encoding becomes extremely serious. Therefore, after the single-channel transmission is higher than 10 Gb/s, a multi-order or higher-order modulation scheme is mostly used. Most common modulation schemes are PAM (Pulse Amplitude Modulation, pulse amplitude modulation) 4, duobinary modulation, quadrature phase shift keying (QPSK) modulation, orthogonal frequency division multiplexing (OFDM) modulation, and the like. When a system supports a plurality of modulation schemes, currently there is still no effective solution to how to register an ONU/ONT (Optical Network Terminal) and put the ONU/ONT online and switch a modulation scheme after registering the ONU/ONT and putting the ONU/ONT online.

SUMMARY

Embodiments of the present invention provide a method for switching a modulation format of a passive optical network, an apparatus, and a system, so that when the passive optical network supports a plurality of modulation schemes, an optical network unit is registered and put online, and a modulation format is switched.

According to one aspect, a method for switching a modulation format of a passive optical network is provided. The method is performed by an optical line terminal on an office end side of a PON system, and the optical line terminal implements interaction with an optical network unit. For example, the optical line terminal separately delivers a registration message to the optical network unit in all supported upstream modulation formats and/or downstream modulation formats. Then, the optical line terminal receives a first message reported by the optical network unit, where the first message includes an upstream modulation format capability and/or a downstream modulation format capability. Then, the optical line terminal determines a target upstream modulation format and/or a target downstream modulation format of the optical network unit according to the first message, and instructs the optical network unit to switch to the target upstream modulation format and/or the target downstream modulation format.

In a possible design, the optical line terminal receives a second message reported by the optical network unit, where the second message includes an indication that the optical network unit has switched to the target upstream modulation format and/or the target downstream modulation format; and the optical line terminal further switches to the target upstream modulation format and/or the target downstream modulation format, delivers an acknowledgement grant message in the target upstream modulation format and/or the target downstream modulation format, and performs synchronization acknowledgement with the optical network unit.

In a possible design, the optical line terminal receives a third message reported by the optical network unit, where the third message includes receiving bit error information; and the optical line terminal further determines, according to the third message, that the optical network unit has switched an upstream modulation format and/or a downstream modulation format.

In a possible design, the optical line terminal delivers a fourth message to the optical network unit to instruct the optical network unit to switch back to a source upstream modulation format and/or a source downstream modulation format.

According to another aspect, a method for switching a modulation format of a passive optical network is provided. Specifically, an optical network unit reports a first message to an optical line terminal, where the first message includes an upstream modulation format capability and/or a downstream modulation format capability. Then, the optical network unit receives a notification message delivered by the optical line terminal, where the notification message includes a target upstream modulation format and/or a target downstream modulation format. Then, the optical network unit switches an upstream modulation format and/or a downstream modulation format to the target upstream modulation format and/or the target downstream modulation format.

In a possible design, the optical network unit reports a second message to the optical line terminal, where the second message includes an indication message that the optical network unit has switched to the target upstream modulation format and/or the target downstream modulation format; and the optical network unit further receives an acknowledgement grant message delivered by the optical line terminal, and performs synchronization acknowledgement with the optical line terminal.

In a possible design, the optical network unit reports a third message to the optical line terminal, where the third message includes receiving bit error information.

In a possible design, the optical network unit receives a fourth message delivered by the optical line terminal, where the fourth message is used to instruct the optical network unit to switch back to a source upstream modulation format and/or a source downstream modulation format; and the optical network unit further switches back to the source upstream modulation format and/or the source downstream modulation format.

According to another aspect, an optical line terminal is provided, and includes: a first sending unit, configured to: separately deliver a registration message to an optical network unit in all supported upstream modulation formats and/or downstream modulation formats, and send a notification message to the optical network unit, where the notification message is used to instruct the optical network unit to switch to the target upstream modulation format and/or the target downstream modulation format; a first receiving unit, configured to receive a first message reported by the optical network unit, where the first message includes an upstream modulation format capability and/or a downstream modulation format capability; and a first processing unit, configured to determine the target upstream modulation format and/or the target downstream modulation format of the optical network unit according to the first message.

According to another aspect, an optical network unit is provided, and includes: a second sending unit, configured to report a first message to an optical line terminal, where the first message includes an upstream modulation format capability and/or a downstream modulation format capability; a second receiving unit, configured to receive a notification message delivered by the optical line terminal, where the notification message includes a target upstream modulation format and/or a target downstream modulation format; and a second processing unit, configured to switch an upstream modulation format and/or a downstream modulation format to the target upstream modulation format and/or the target downstream modulation format.

According to another aspect, a passive optical network system is provided, and includes the foregoing optical line terminal and the foregoing optical network unit.

According to another aspect, a network element is provided, and includes: a memory, configured to store computer executable program code; a transceiver; and a processor that is coupled to the memory and the transceiver.

The program code includes an instruction, and when the processor executes the instruction, the instruction enables the network element to perform the following operations: separately delivering a registration message to an optical network unit in all supported upstream modulation formats and/or downstream modulation formats; receiving a first message reported by the optical network unit, where the first message includes an upstream modulation format capability and/or a downstream modulation format capability; and determining a target upstream modulation format and/or a target downstream modulation format of the optical network unit according to the first message, and instructing the optical network unit to switch to the target upstream modulation format and/or the target downstream modulation format.

According to another aspect, a network element is provided, and includes: a memory, configured to store computer executable program code; a transceiver; and a processor that is coupled to the memory and the transceiver.

The program code includes an instruction, and when the processor executes the instruction, the instruction enables the network element to perform the following operations: reporting a first message to an optical line terminal, where the first message includes an upstream modulation format capability and/or a downstream modulation format capability; receiving a notification message delivered by the optical line terminal, where the notification message includes a target upstream modulation format and/or a target downstream modulation format; and switching an upstream modulation format and/or a downstream modulation format to the target upstream modulation format and/or the target downstream modulation format.

It can be learned from the foregoing technical solutions that in the present invention, the OLT separately delivers the registration message to the optical network unit in all the supported upstream modulation formats and/or downstream modulation formats. Then, the OLT receives the first message reported by the optical network unit, where the first message includes the upstream modulation format capability and/or the downstream modulation format capability. Finally, the OLT determines the target upstream modulation format and/or the target downstream modulation format of the optical network unit according to the first message, and instructs the optical network unit to switch to the target upstream modulation format and/or the target downstream modulation format. Therefore, in a PON system that supports a plurality of modulation formats, a modulation format reporting capability of the ONU is improved, the ONU is registered and put online, and a modulation scheme is switched after the ONU is registered and put online.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 2:
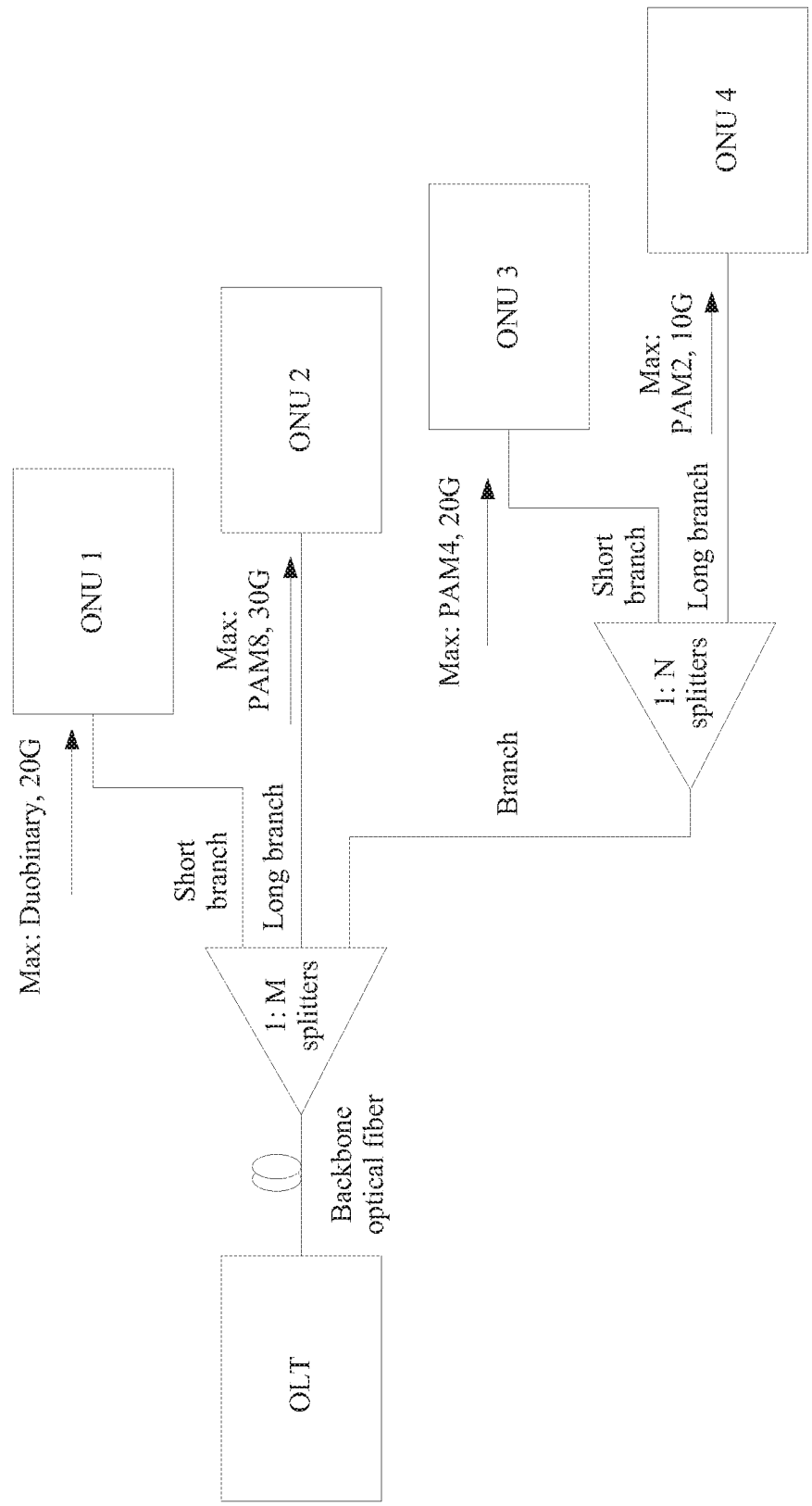
FIG. 2 is a diagram of a passive optical network system in which a plurality of modulation schemes coexist.

As shown in FIG. 2, FIG. 2 shows a PON system in which a plurality of modulation schemes coexist. An ONU 1 uses a duobinary modulation scheme, and a maximum transmission rate may reach 20G. An ONU 2 uses a PAM8 (8-level PAM) modulation scheme, and a maximum transmission rate may reach 30G. An ONU 3 uses a PAM4 (4-level PAM) modulation scheme, and a maximum transmission rate may reach 20G. An ONU 4 uses a PAM2 (2-level PAM) modulation scheme, and a maximum transmission rate may reach 10G. The foregoing modulation schemes may coexist, for example, NRZ and PAM4 coexist, or duobinary and PAM4 coexist, or even more than two modulation schemes coexist.

Figure 3A:
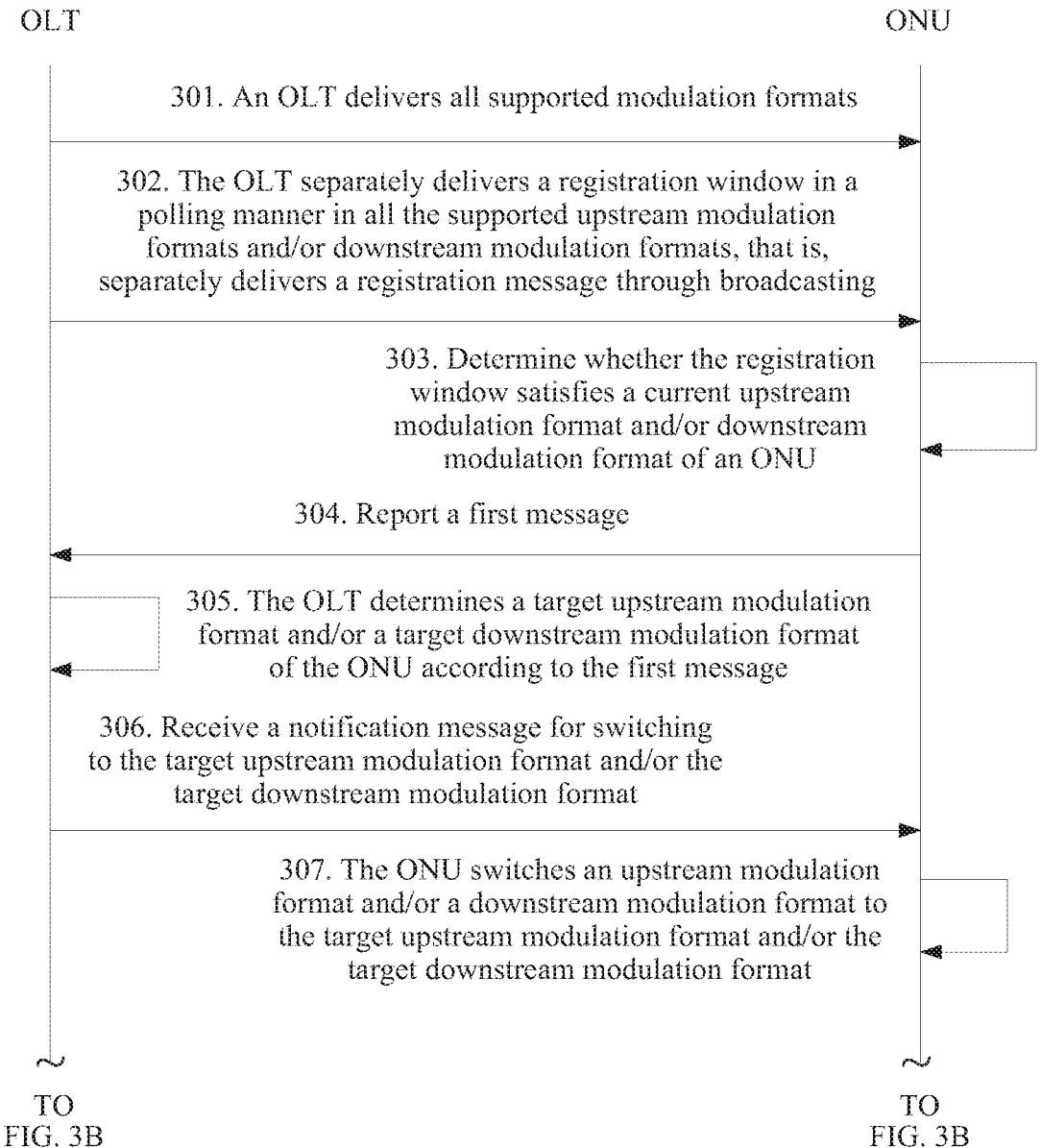
FIG. 3A and FIG. 3B are a flowchart of a method for switching a modulation format of a PON system according to an embodiment of the present invention.
Figure 3B:
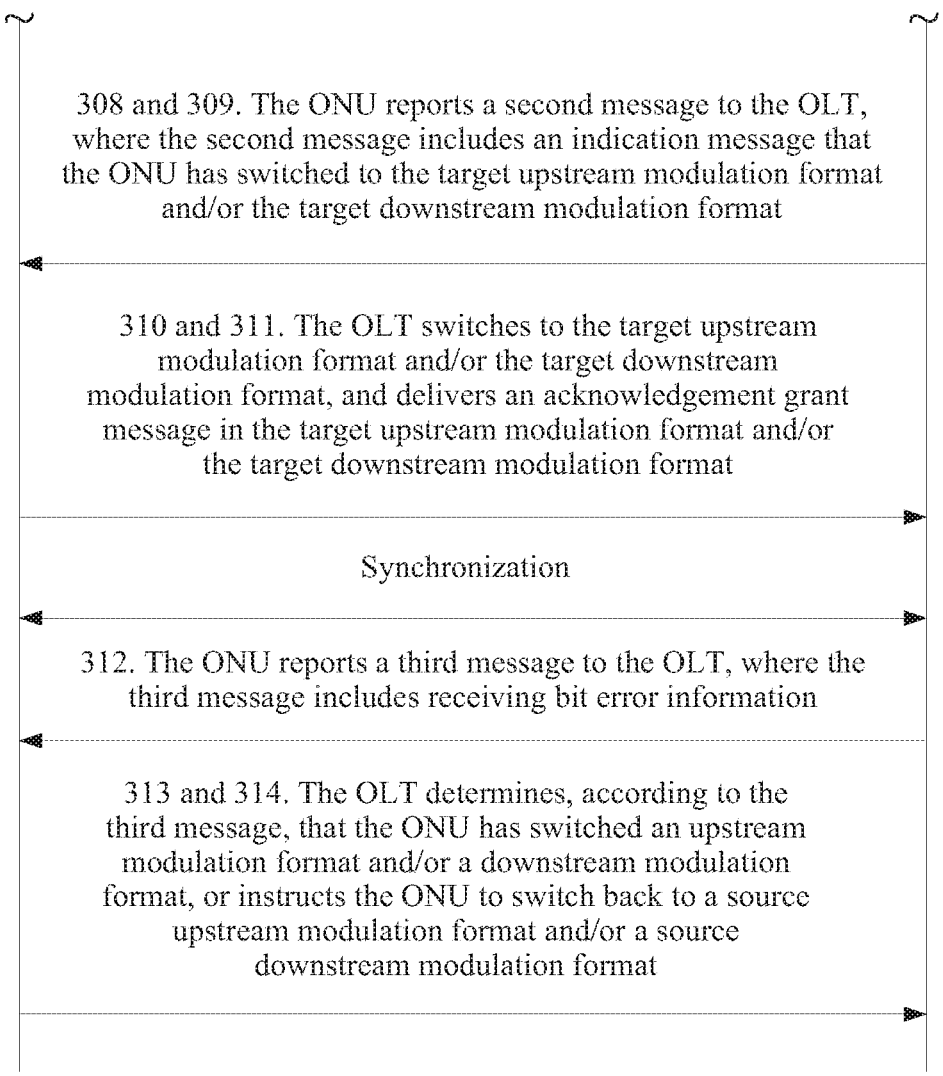

As shown in FIG. 3A and FIG. 3B, FIG. 3A and FIG. 3B are a flowchart of a method for switching a modulation format of a PON system according to an embodiment of the present invention. The method includes the following steps.

Step 301: An OLT delivers all supported modulation formats, and notifies an ONU. It should be noted that the ONU learns, before being registered, all the upstream modulation formats and/or downstream modulation format supported by the OLT.

Step 302: The OLT separately delivers a registration window in a polling manner in all the supported upstream modulation formats and/or downstream modulation formats, that is, separately delivers a registration message to the ONU through broadcasting.

Step 303: The ONU determines whether the registration window satisfies a current upstream modulation format and/or downstream modulation format of the ONU. If the registration window satisfies the current upstream modulation format and/or downstream modulation format of the ONU, the ONU is registered and put online in the currently supported upstream modulation format and/or downstream modulation format, and reports a first message, where the first message includes an upstream modulation format capability and/or a downstream modulation format capability. If the registration window does not satisfy the current upstream modulation format and/or downstream modulation format of the ONU, registration is suspended.

Step 304: The OLT receives the first message reported by the ONU.

Step 305: The OLT determines a target upstream modulation format and/or a target downstream modulation format of the ONU according to the first message, and instructs the ONU to switch to the target upstream modulation format and/or the target downstream modulation format.

Step 306: The ONU receives a notification message delivered by the OLT, where the notification message includes the target upstream modulation format and/or the target downstream modulation format.

Step 307: The ONU switches an upstream modulation format and/or a downstream modulation format to the target upstream modulation format and/or the target downstream modulation format.

Step 308: The ONU reports a second message to the OLT, where the second message includes an indication message that the ONU has switched to the target upstream modulation format and/or the target downstream modulation format.

In another implementation of this step, after reporting the second message to the OLT, the ONU determines whether an acknowledgement grant message delivered by the optical line terminal is received within a second preset time, and if the acknowledgement grant message delivered by the optical line terminal is not received within the second preset time, switches back to a source upstream modulation format and/or a source downstream modulation format.

Step 309: The OLT receives the second message reported by the optical network unit, where the second message includes an indication that the ONU has switched to the target upstream modulation format and/or the target downstream modulation format.

Step 310: The OLT switches to the target upstream modulation format and/or the target downstream modulation format, delivers an acknowledgement grant message in the target upstream modulation format and/or the target downstream modulation format, and performs synchronization acknowledgement with the optical network unit.

In this step, in another embodiment, the OLT delivers the acknowledgement grant message, and enables a timeout mechanism. The OLT determines whether the optical network unit receives the acknowledgement grant message within a first preset time, and if no, a value of a counter is increased by 1. Then, the OLT determines whether the value of the counter is greater than a threshold, and if the value of the counter is greater than the threshold, ends switching of an upstream modulation format and/or a downstream modulation format.

Step 311: The ONU receives the acknowledgement grant message delivered by the OLT, and performs synchronization acknowledgement with the OLT.

Step 312: The ONU reports a third message to the OLT, where the third message includes receiving bit error information.

Step 313: The OLT determines, according to the third message, that the ONU has switched the upstream modulation format and/or the downstream modulation format, or enters step 314.

Step 314: Instruct the ONU to switch back to a source upstream modulation format and/or a source downstream modulation format.

In this embodiment of the present invention, in a PON system that supports a plurality of modulation formats, a modulation format reporting capability of the ONU is improved, the ONU is registered and put online, and a modulation scheme is switched after the ONU is registered and put online.

It should be noted that a protocol message needs to be extended to switch the downstream modulation format and/or the upstream modulation format.

Figure 4:
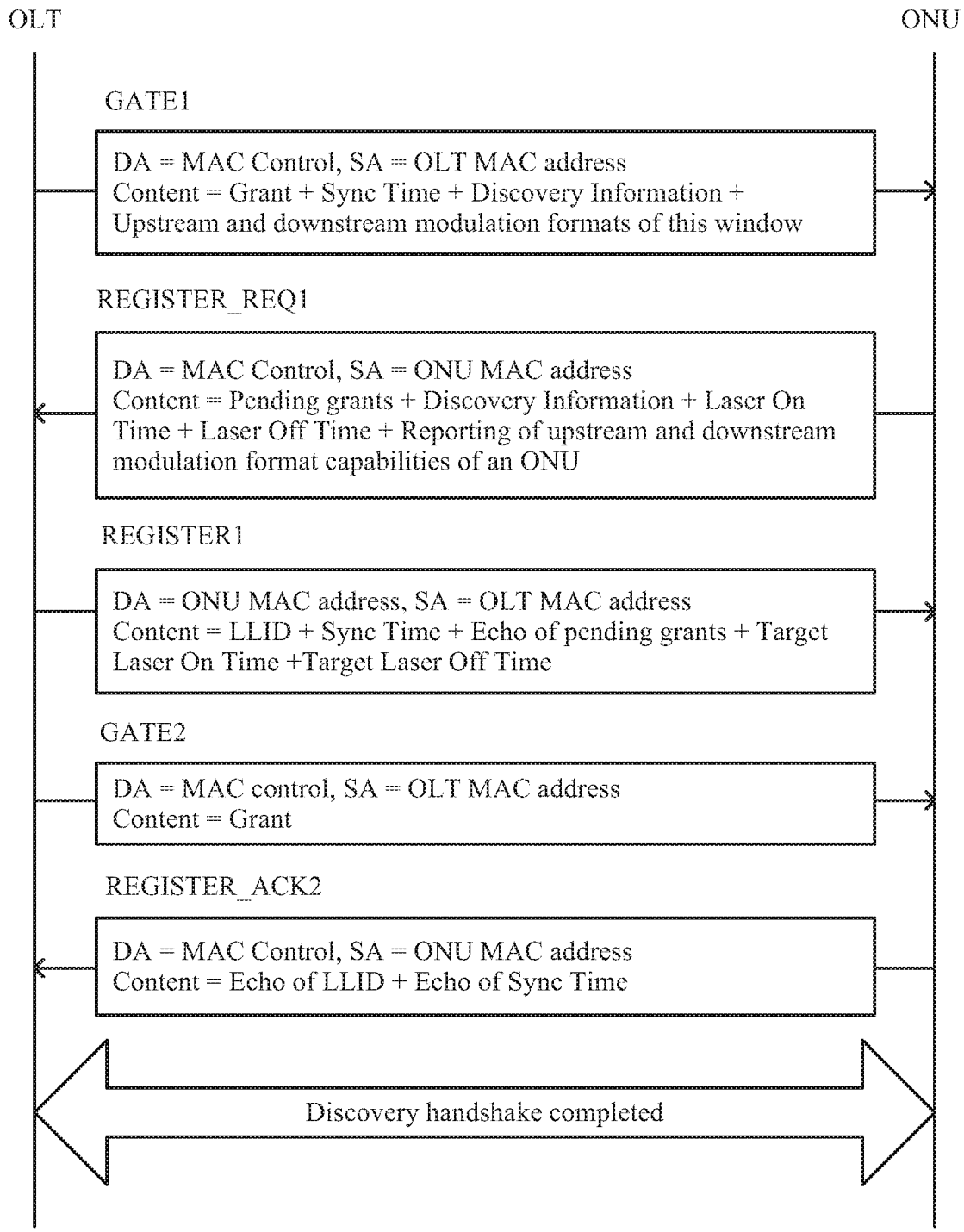
FIG. 4 is a flowchart of registering an ONU and putting the ONU online in a scenario in which a downstream modulation scheme is adjustable according to an embodiment of the present invention.

In one manner, as shown in FIG. 4, during registration of the ONU, an MPCP (Multi-Point Control Protocol) message is extended to switch a modulation format. For example, (1)

a GATE message is extended, and a downstream modulation format and/or an upstream modulation format supported by this window are/is newly added; (2) a REGISTER_REQ message is extended, and downstream and/or upstream modulation format capability information of the ONU are/is newly added.

Figure 5A:
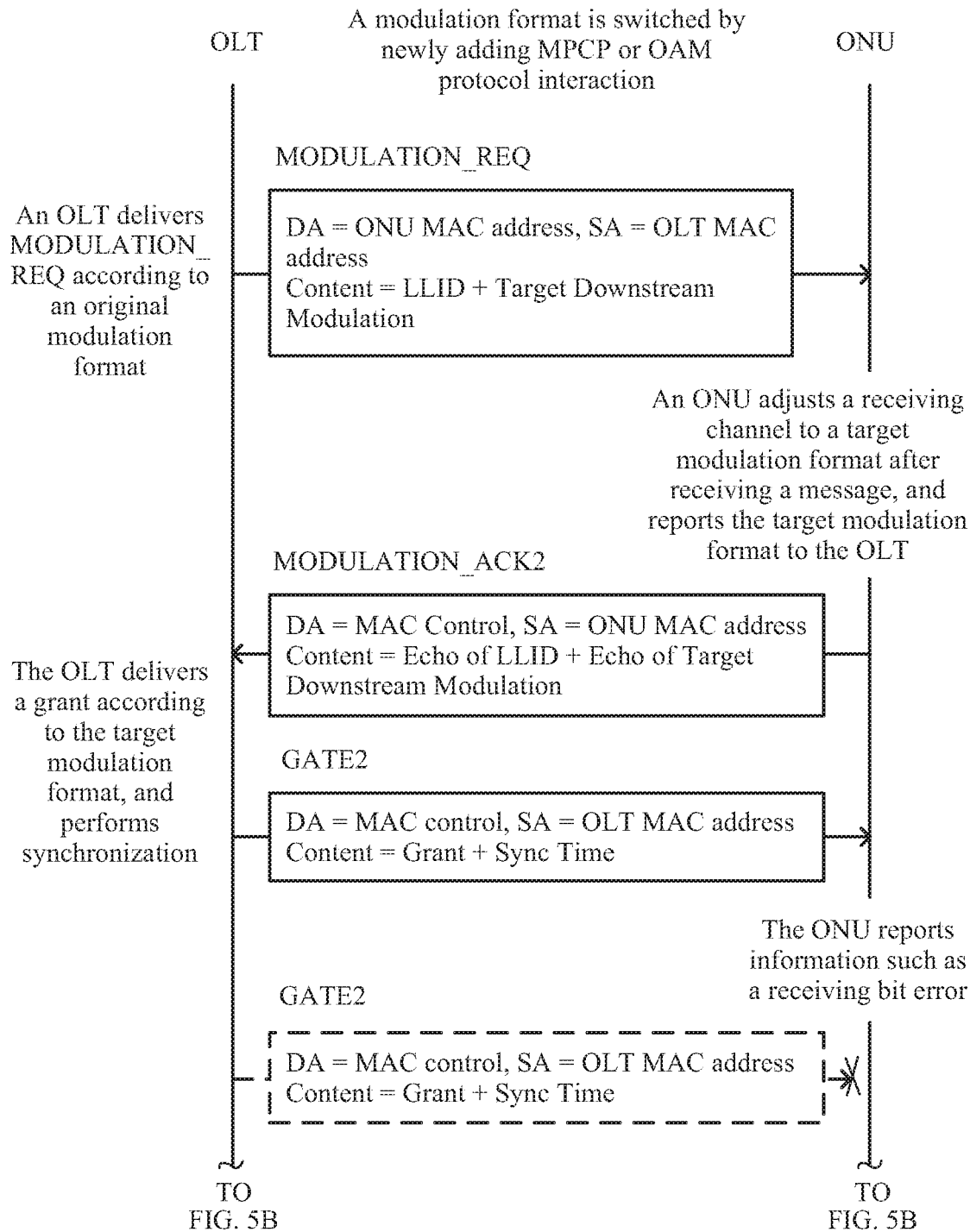
FIG. 5A and FIG. 5B are a flowchart of switching a modulation format by an ONU in a scenario in which a downstream modulation format is adjustable according to an embodiment of the present invention.
Figure 5B:
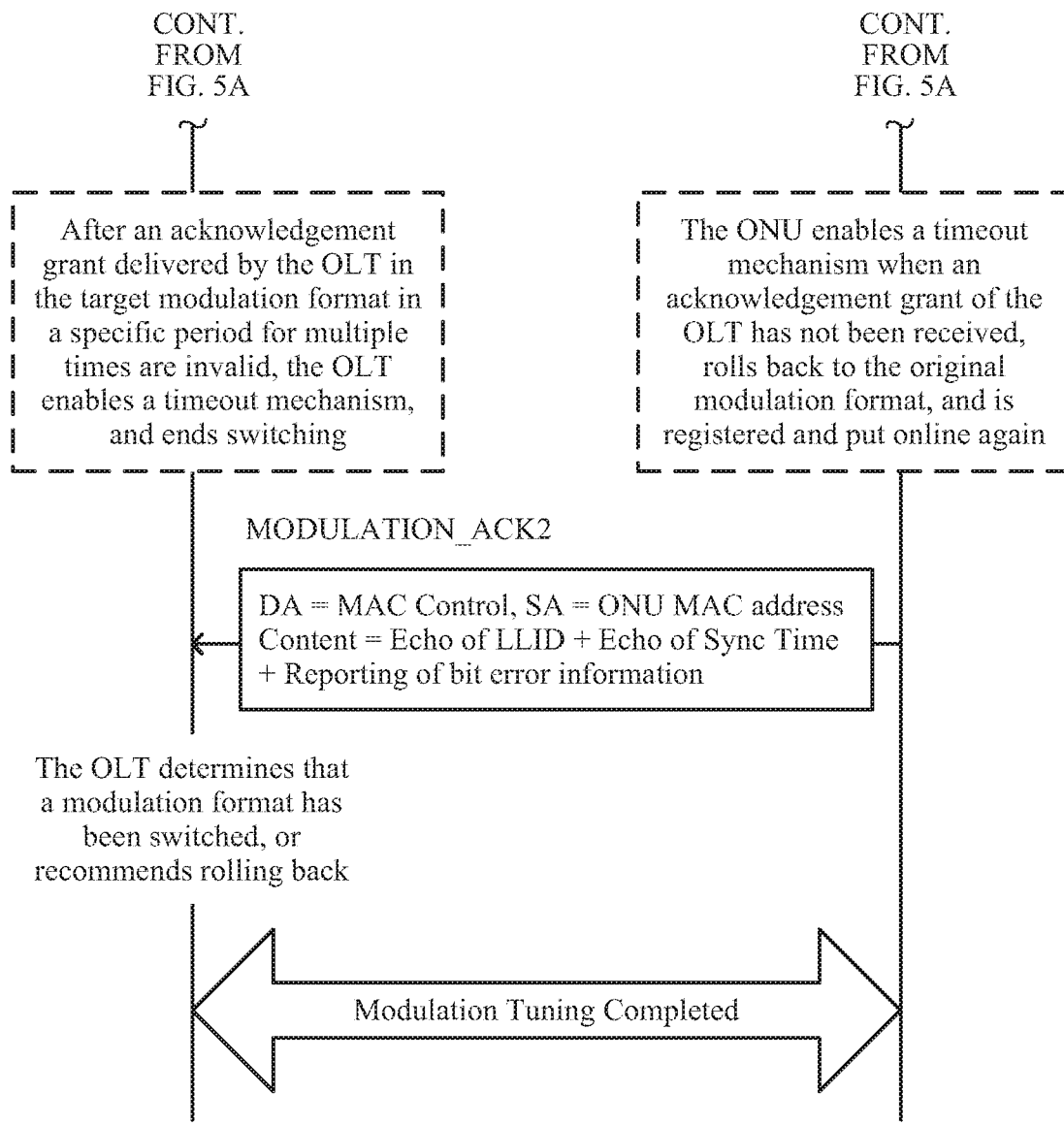

In another manner, as shown in FIG. 5A and FIG. 5B, an MPCP message is extended to switch a modulation format, and a message such as MODULATION_REQ MPCPDU (Multi-Point Control Protocol Data Unit) or MODULATION_ACK MPCPDU is newly added. The MODULATION_REQ MPCPDU includes information such as an LLID (Logical Link Identifier) and a target downstream modulation (target downstream modulation) format. The MODULATION_ACK MPCPDU includes information such as an echo of LLID, an echo of target downstream modulation, an echo of Sync (echo of synchronization), and an ONU receiving bit error.

Alternatively, the extension of an MPCP message may be replaced by extension of an OAM (Operation Administration and Maintenance) message or a PLOAM (Physical Layer Operation, Administration and Maintenance) message. For example, downstream and/or upstream modulation format information are/is reported through information OAMPDU (Operation Administration and Maintenance Provisioning Data Unit) information extension of the ONU, and a modulation format is switched by newly adding MODULATION_REQ OAMPDU and MODULATION_ACK OAMPDU. A procedure of switching a modulation format by an OAMPDU is the same as a procedure of switching a modulation format by using the MPCP.

Figure 6:
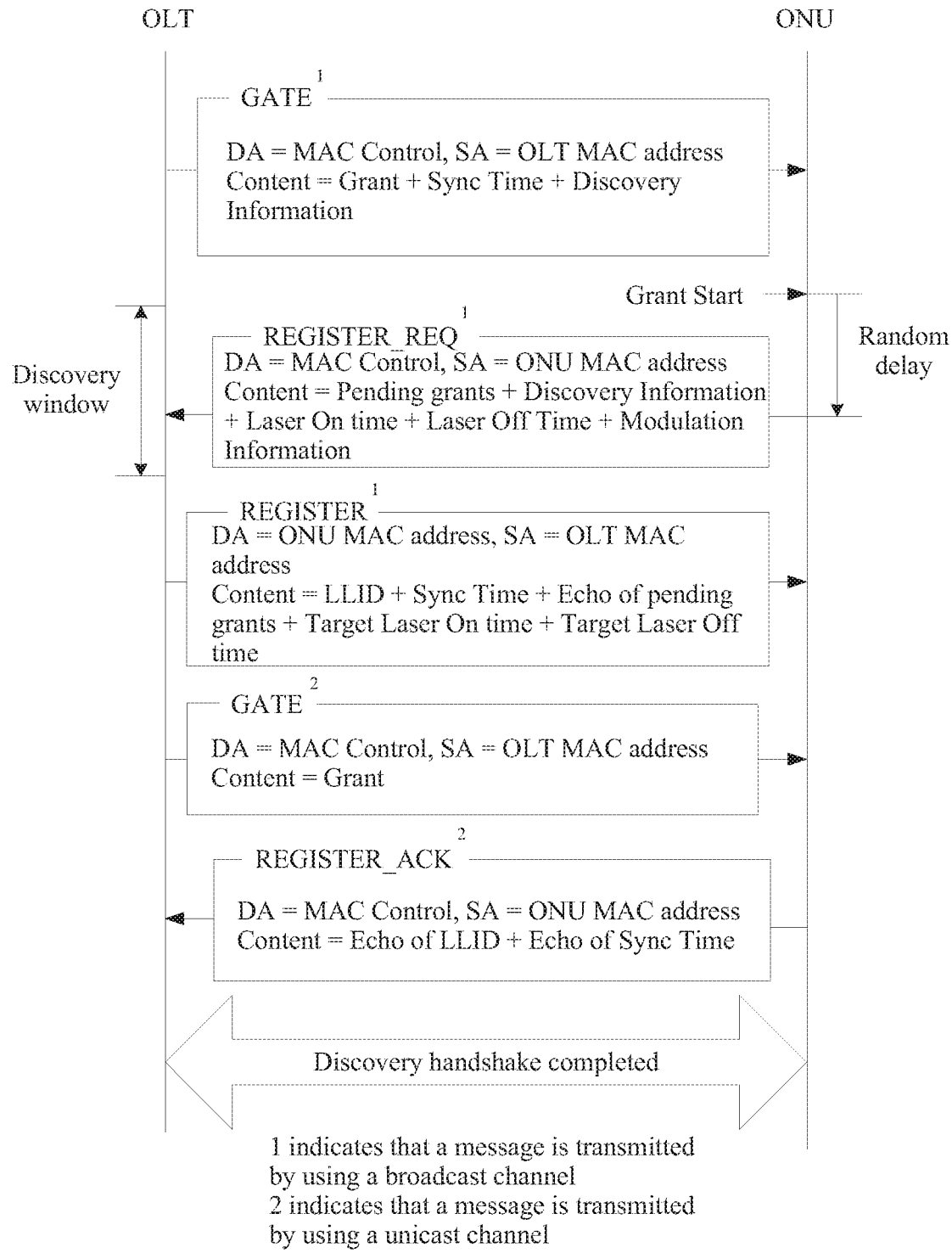
FIG. 6 is a flowchart of switching a modulation format by an ONU in a scenario in which an upstream modulation format is adjustable according to an embodiment of the present invention.

As shown in FIG. 6, a third manner is that discovery information fields of REGISTER_REQ MPCPDU are extended, where extension is performed in bits 6 to 15 of the discovery information fields, and "ONU upstream is PAM4 capable", "ONU upstream is PAM8 capable", or the like is added to implement a modulation format registration procedure. Alternatively, REGISTER_REQ MPCPDU is extended, modulation information fields are newly added, and a bit such as "ONU upstream is PAM4 capable (ONU upstream is PAM4 capable)" or "ONU upstream is PAM8 capable (ONU upstream is PAM8 capable)" is newly added in the modulation information fields. OPCODE types are newly added: MODULATION_REQ and MODULATION_ACK MPCPDU. The MODULATION_REQ MPCPDU includes information such as an LLID and target upstream modulation. The MODULATION ACK MPCPDU includes information such as an echo of LLID and an echo of target upstream modulation. An extended MPCP message may be replaced by an extended OAM or PLOAM message.

Figure 7:
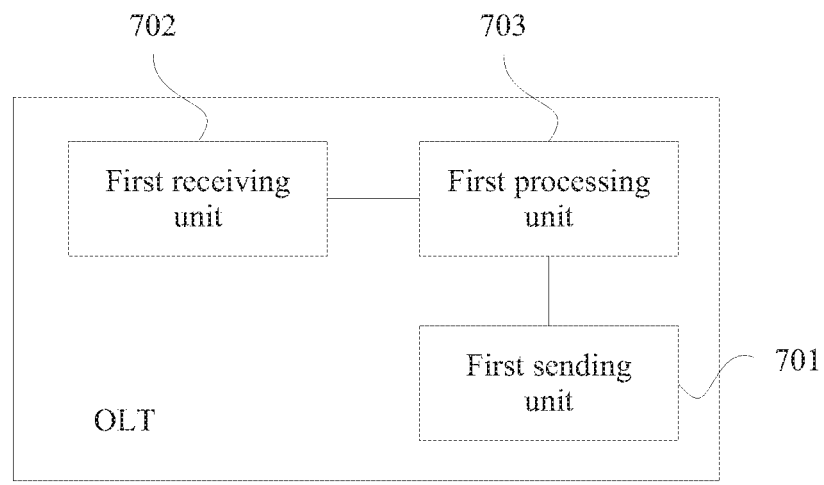
FIG. 7 is a block diagram of an optical line terminal according to an embodiment of the present invention.

As shown in FIG. 7, the present invention further discloses an optical line terminal OLT, including:
a first sending unit 701, configured to: separately deliver a registration message to an optical network unit in all supported upstream modulation formats and/or downstream modulation formats; and send a notification message to the optical network unit, where the notification message is used to instruct the optical network unit to switch to a target upstream modulation format and/or a target downstream modulation format;
a first receiving unit 702, configured to receive a first message reported by the optical network unit, where the first message includes an upstream modulation format capability and/or a downstream modulation format capability; and
a first processing unit 703, configured to determine the target upstream modulation format and/or the target downstream modulation format of the optical network unit according to the first message.

Optionally, the first receiving unit 703 is further configured to receive a second message reported by the optical network unit. The second message includes an indication that the optical network unit has switched to the target upstream modulation format and/or the target downstream modulation format. The first processing unit 702 is further configured to switch the optical line terminal to the target upstream modulation format and/or the target downstream modulation format. The first sending unit 701 is further configured to: deliver an acknowledgement grant message in the target upstream modulation format and/or the target downstream modulation format, and perform synchronization acknowledgement with the optical network unit.

Optionally, the first receiving unit 702 is further configured to receive a third message reported by the optical network unit. The third message includes receiving bit error information. The first processing unit 703 is further configured to determine, according to the third message, that the optical network unit has switched an upstream modulation format and/or a downstream modulation format.

Optionally, the first sending unit 701 is further configured to deliver a fourth message to the optical network unit. The fourth message is used to instruct the optical network unit to switch back to a source upstream modulation format and/or a source downstream modulation format.

Optionally, the first processing unit 703 is further configured to: determine whether the optical network unit receives the acknowledgement grant message within a first preset time, and if no, increase a value of a counter by 1; and is configured to: determine whether the value of the counter is greater than a threshold, and if the value of the counter is greater than the threshold, end switching of an upstream modulation format and/or a downstream modulation format.

Figure 8:
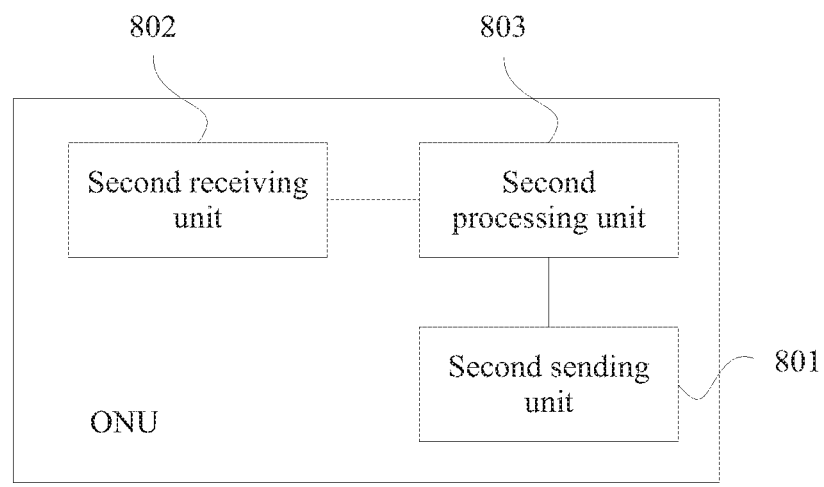
FIG. 8 is a block diagram of an optical network unit according to an embodiment of the present invention.

As shown in FIG. 8, the present invention further discloses an optical network unit ONU, including:
a second sending unit 801, configured to report a first message to an optical line terminal, where the first message includes an upstream modulation format capability and/or a downstream modulation format capability;
a second receiving unit 802, configured to receive a notification message delivered by the optical line terminal, where the notification message includes a target upstream modulation format and/or a target downstream modulation format; and
a second processing unit 803, configured to switch an upstream modulation format and/or a downstream modulation format to the target upstream modulation format and/or the target downstream modulation format.

In another embodiment, the second sending unit 801 is further configured to report a second message to the optical line terminal. The second message includes an indication message that the optical network unit has switched to the target upstream modulation format and/or the target downstream modulation format. The second receiving unit 802 is further configured to receive an acknowledgement grant message delivered by the optical line terminal. The second processing unit 803 is further configured to perform synchronization acknowledgement with the optical line terminal.

In another embodiment, the second sending unit 801 is further configured to report a third message to the optical line terminal. The third message includes receiving bit error information.

In another embodiment, the second receiving unit 802 is further configured to receive a fourth message delivered by the optical line terminal. The fourth message is used to instruct the optical network unit to switch back to a source upstream modulation format and/or a source downstream modulation format. The second processing unit 803 is further configured to switch the optical network unit back to the source upstream modulation format and/or the source downstream modulation format.

In another embodiment, the second processing unit 803 is further configured to: determine whether the acknowledgement grant message delivered by the optical line terminal is received within a second preset time, and if no, switch back to a source upstream modulation format and/or a source downstream modulation format.

Figure 1:
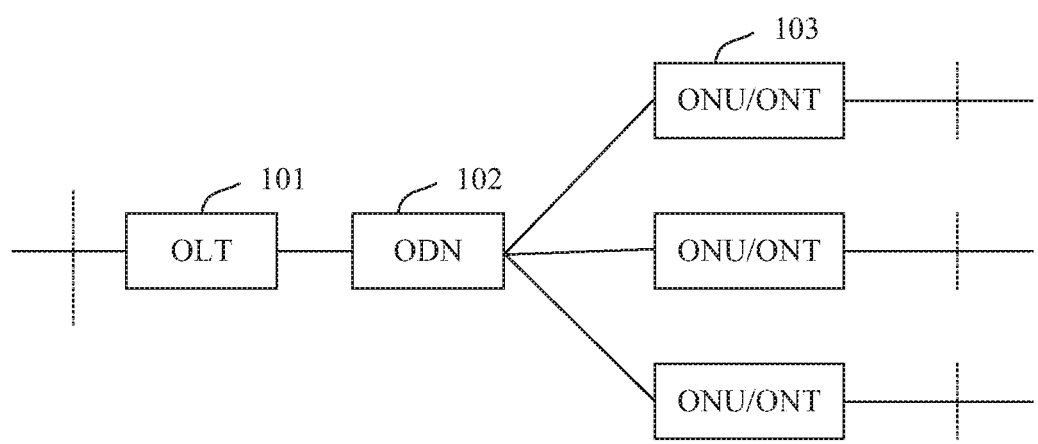
FIG. 1 is a structural diagram of a framework of a passive optical network system.

An embodiment of the present invention further discloses a passive optical network. As shown in FIG. 1, the passive optical network includes the optical line terminal shown in the foregoing embodiments and FIG. 7 and the optical network unit shown in the foregoing embodiments and FIG. 8.

Figure 9:
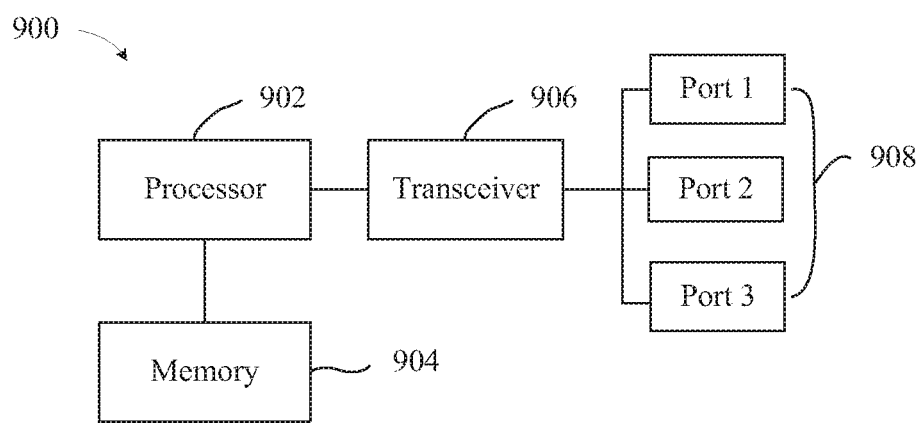
FIG. 9 is a schematic structural diagram of a network element according to an embodiment of the present invention.

FIG. 9 is a schematic structural diagram of a network element used as an optical line terminal according to an embodiment of the present invention. The network element is configured to transmit or process data in a PON system shown in FIG. 2. A network element 900 may include one or more ports 908 coupled to a transceiver (transceiver) 906. The transceiver 906 may be a transmitter, a receiver, or a combination thereof, and sends or receives a data packet to or from another network node by using the port 908. A processor 902 is coupled to the transceiver 906, and is configured to process the data packet. The processor 902 may include one or more multi-core processors and/or a memory 904. The processor 902 may be a general-purpose processor, an application-specific integrated circuit, or a digital signal processor (DSP).

The memory 904 may be a non-transitory storage medium, be coupled to the processor 902, and be configured to store data of different types. The memory 904 may include a read-only memory (ROM), a random access memory (RAM), or another type of dynamic storage device that may store information and an instruction, or may be a disk memory. The memory 904 may be configured to store an instruction for implementing a PON system or a related method. It may be understood that the network element 900 may be converted into a particular device such as a router, a switch, or an MDU by programming or loading an executable instruction to at least one of the processor 902, a cache, or a long-term memory of the network element 900.

The network element 900 may execute one or more instructions according to an embodiment of the present invention, to obtain service chain information. The instructions may be stored in the memory 904, or may be integrated into a kernel or a plug-in of the kernel in an operating system of the network element.

In another embodiment, the network element 900 is used as an optical line terminal, and includes a memory 904, a processor 902, a transceiver 906, and one or more ports 908 coupled to the transceiver. The memory 904 is configured to store computer executable program code, and the processor 902 is coupled to the memory 904 and the transceiver 906.

The program code includes an instruction, and when the processor executes the instruction, the instruction enables the network element to perform the following operations: separately delivering a registration message to an optical network unit in all supported upstream modulation formats and/or downstream modulation formats; receiving a first message reported by the optical network unit, where the first message includes an upstream modulation format capability and/or a downstream modulation format capability; and determining a target upstream modulation format and/or a target downstream modulation format of the optical network unit according to the first message, and instructing the optical network unit to switch to the target upstream modulation format and/or the target downstream modulation format.

For specific implementations of the operations performed by the processor included in the network element used as the optical line terminal, refer to corresponding steps performed by the optical line terminal in the embodiment in FIG. 3A and FIG. 3B. Details are not described again in this embodiment of the present invention.

Figure 10:
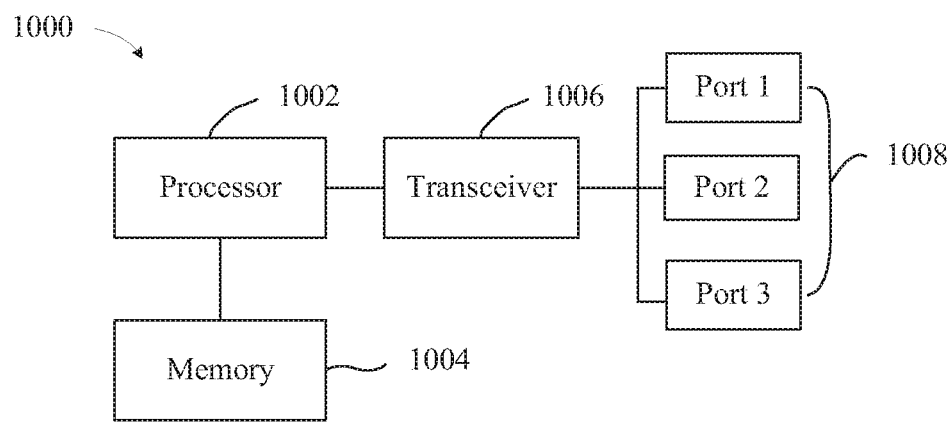
FIG. 10 is a schematic structural diagram of another network element according to an embodiment of the present invention.

FIG. 10 is a schematic structural diagram of a network element used as an optical network unit according to an embodiment of the present invention. A network element 1000 may include one or more ports 1008 coupled to a transceiver 1006. The transceiver 1006 may be a transmitter, a receiver, or a combination thereof, and sends or receives a data packet to or from another network node by using the port 1008. A processor 1002 is coupled to the transceiver 1006, and is configured to process the data packet. The processor 1002 may include one or more multi-core processors and/or a memory 1004. The processor 1002 may be a general-purpose processor, an application-specific integrated circuit (ASIC), or a digital signal processor (DSP).

The memory 1004 may be a non-transitory storage medium, be coupled to the processor 1002, and be configured to store data of different types. The memory 1004 may include a read-only memory (ROM), a random access memory (RAM), or another type of dynamic storage device that may store information and an instruction, or may be a disk memory. The memory 1004 may be configured to store an instruction for implementing an PON system or a related method. It may be understood that the network element 1000 may be converted into a particular device such as a router, a switch, or an MDU by programming or loading an executable instruction to at least one of the processor 1002, a cache, or a long-term memory of the network element 1000.

In another embodiment, the network element 1000 is used as an optical network unit, and includes a memory 1004, a processor 1002, a transceiver 1006, and one or more ports 1008 coupled to the transceiver. The memory 1004 is configured to store computer executable program code, and the processor 1002 is coupled to the memory 1004 and the transceiver 1006.

The program code includes an instruction, and when the processor executes the instruction, the instruction enables the network element to perform the following operations: reporting a first message to an optical line terminal, where the first message includes an upstream modulation format capability and/or a downstream modulation format capability; receiving a notification message delivered by the optical line terminal, where the notification message includes a target upstream modulation format and/or a target downstream modulation format: and switching an upstream modulation format and/or a downstream modulation format to the target upstream modulation format and/or the target downstream modulation format.

For specific implementations of the operations performed by the processor included in the network element used as the optical network unit, refer to corresponding steps performed by the optical network unit in the embodiment in FIG. 3A and FIG. 3B. Details are not described again in this embodiment of the present invention.

A person of ordinary skill in the art should understand that all or some of subject matters in this application may be implemented in software with reference to hardware and/or firmware. For example, the subject matters described in this specification may be implemented in software that is performed by one or more processors. In an example implementation, the subject matters described in this specification may be implemented by using a non-transitory computer readable medium that stores a computer executable instruction. When a computer processor executes the computer executable instruction, the instruction controls the computer to perform steps. An example computer readable medium applicable to the subject matters described in this specification includes a non-transitory computer readable medium, such as a magnetic disk storage device, a chip storage device, a programmable logical device, or an application-specific integrated circuit. In addition, the computer readable medium that implements the subject matters described in this specification may be located on a single device or computing platform, or may be distributed on multiple devices or computing platforms.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method implemented at an optical line terminal for switching a modulation format of a passive optical network, comprising:
    subsequent to notifying an optical network unit of all upstream modulation formats and/or downstream modulation formats supported by the optical line terminal, separately delivering a registration message indicative of a registration window to the optical network unit in all supported upstream modulation formats and/or downstream modulation formats;
    receiving a first message reported by the optical network unit, wherein the first message indicates the registration window satisfies a current upstream modulation format and/or downstream modulation format of the optical network unit, and comprises an upstream modulation format capability and/or a downstream modulation format capability; and
    determining a target upstream modulation format and/or a target downstream modulation format of the optical network unit according to the first message, and instructing the optical network unit to switch to the target upstream modulation format and/or the target downstream modulation format.

2. The method according to claim 1, wherein after the instructing the optical network unit to switch to the target upstream modulation format and/or the target downstream modulation format, the method further comprises:
    receiving a second message reported by the optical network unit, wherein the second message comprises an indication that the optical network unit has switched to the target upstream modulation format and/or the target downstream modulation format; and
    switching to the target upstream modulation format and/or the target downstream modulation format, delivering an acknowledgement grant message in the target upstream modulation format and/or the target downstream modulation format, and performing synchronization acknowledgement with the optical network unit.

3. The method according to claim 2, wherein after the delivering an acknowledgement grant message in the target upstream modulation format and/or the target downstream modulation format, and performing synchronization acknowledgement with the optical network unit, the method further comprises:
    receiving a third message reported by the optical network unit, wherein the third message comprises receiving bit error information; and
    determining, according to the third message, that the optical network unit has switched an upstream modulation format and/or a downstream modulation format.

4. The method according to claim 3, further comprising:
    delivering a fourth message to the optical network unit to instruct the optical network unit to switch back to a source upstream modulation format and/or a source downstream modulation format.

5. The method according to claim 2, wherein after the delivering of the acknowledgement grant message in the target upstream modulation format and/or the target downstream modulation format, the method further comprises:
    determining whether the optical network unit receives the acknowledgement grant message within a first preset time, and if the optical network unit does not receive the acknowledgement grant message within the first preset time, increasing a value of a counter by 1; and
    determining whether the value of the counter is greater than a threshold, and if the value of the counter is greater than the threshold, ending switching of an upstream modulation format and/or a downstream modulation format.

6. A method implemented at an optical network unit for switching a modulation format of a passive optical network, comprising:
    subsequent to receiving from an optical line terminal a notification of all upstream modulation formats and/or downstream modulation formats supported by the optical line terminal, receiving from the optical line terminal a registration message indicative of a registration window in an upstream modulation format and/or a downstream modulation format;
    in response to a registration window satisfying a current upstream modulation format and/or downstream modulation format of the optical network unit reporting a first message to the optical line terminal, wherein the first message comprises an upstream modulation format capability and/or a downstream modulation format capability;
    receiving a notification message delivered by the optical line terminal, wherein the notification message comprises a target upstream modulation format and/or a target downstream modulation format; and
    switching an upstream modulation format and/or a downstream modulation format to the target upstream modulation format and/or the target downstream modulation format.

7. The method according to claim 6, wherein after the switching of the upstream modulation format and/or the downstream modulation format to the target upstream modulation format and/or the target downstream modulation format, the method further comprises:
    reporting a second message to the optical line terminal, wherein the second message comprises an indication message that the optical network unit has switched to the target upstream modulation format and/or the target downstream modulation format; and receiving an acknowledgement grant message delivered by the optical line terminal, and performing synchronization acknowledgement with the optical line terminal.

8. The method according to claim 7, wherein after the receiving of the acknowledgement grant message delivered by the optical line terminal, and performing synchronization acknowledgement with the optical line terminal, the method further comprises:

reporting a third message to the optical line terminal, wherein the third message comprises receiving bit error information.

9. The method according to claim 8, further comprising:

receiving a fourth message delivered by the optical line terminal, wherein the fourth message is used to instruct the optical network unit to switch back to a source upstream modulation format and/or a source downstream modulation format; and switching back to the source upstream modulation format and/or the source downstream modulation format.

10. An optical line terminal, comprising:

a sending unit, configured to: subsequent to notifying an optical network unit of all upstream modulation formats and/or downstream modulation formats supported by the optical line terminal, separately deliver a registration message indicative of a registration window to the optical network unit in all supported upstream modulation formats and/or downstream modulation formats; and send a notification message to the optical network unit, wherein the notification message is used to instruct the optical network unit to switch to a target upstream modulation format and/or a target downstream modulation format;

a receiving unit, configured to receive a first message reported by the optical network unit, wherein the first message indicates the registration window satisfies a current upstream modulation format and/or downstream modulation format of the optical network unit, and comprises an upstream modulation format capability and/or a downstream modulation format capability; and a processing unit, configured to determine the target upstream modulation format and/or the target downstream modulation format of the optical network unit according to the first message.

11. The optical line terminal according to claim 10, wherein the receiving unit is further configured to receive a second message reported by the optical network unit, wherein the second message comprises an indication that the optical network unit has switched to the target upstream modulation format and/or the target downstream modulation format;

the processing unit is further configured to switch the optical line terminal to the target upstream modulation format and/or the target downstream modulation format; and the sending unit is further configured to: deliver an acknowledgement grant message in the target upstream modulation format and/or the target downstream modulation format, and perform synchronization acknowledgement with the optical network unit.

12. The optical line terminal according to claim 11, wherein the receiving unit is further configured to receive a third message reported by the optical network unit, wherein the third message comprises receiving bit error information; and the processing unit is further configured to determine, according to the third message, that the optical network unit has switched an upstream modulation format and/or a downstream modulation format.

13. The optical line terminal according to claim 12, wherein the sending unit is further configured to deliver a fourth message to the optical network unit, wherein the fourth message is used to instruct the optical network unit to switch back to a source upstream modulation format and/or a source downstream modulation format.

14. The optical line terminal according to claim 11, wherein the processing unit is further configured to: determine whether the optical network unit receives the acknowledgement grant message within a preset time, and if not, increase a value of a counter by 1; and is configured to: determine whether the value of the counter is greater than a threshold, and if the value of the counter is greater than the threshold, end switching of an upstream modulation format and/or a downstream modulation format.

15. An optical network unit, comprising:

a receiving unit, configured to: subsequent to receiving from an optical line terminal a notification of all upstream modulation formats and/or downstream modulation formats supported by the optical line terminal, receive from the optical line terminal a registration message indicative of a registration window in an upstream modulation format and/or a downstream modulation format;

a sending unit, configured to: in response to the registration window satisfying a current upstream modulation format and/or downstream modulation format of the optical network unit, report a first message to the optical line terminal, wherein the first message comprises an upstream modulation format capability and/or a downstream modulation format capability;

the receiving unit being further configured to receive a notification message delivered by the optical line terminal, wherein the notification message comprises a target upstream modulation format and/or a target downstream modulation format; and a processing unit, configured to switch an upstream modulation format and/or a downstream modulation format to the target upstream modulation format and/or the target downstream modulation format.

16. The optical network unit according to claim 15, wherein the sending unit is further configured to report a second message to the optical line terminal, wherein the second message comprises an indication message that the optical network unit has switched to the target upstream modulation format and/or the target downstream modulation format;

the receiving unit is further configured to receive an acknowledgement grant message delivered by the optical line terminal; and the processing unit is further configured to perform synchronization acknowledgement with the optical line terminal.

17. The optical network unit according to claim 16, wherein
the sending unit is further configured to report a third message to the optical line terminal, wherein the third message comprises receiving bit error information.

18. The optical network unit according to claim 17, wherein
the receiving unit is further configured to receive a fourth message delivered by the optical line terminal, wherein the fourth message is used to instruct the optical network unit to switch back to a source upstream modulation format and/or a source downstream modulation format; and
the processing unit is further configured to switch the optical network unit back to the source upstream modulation format and/or the source downstream modulation format.

19. The optical network unit according to claim 16, wherein
the processing unit is further configured to: determine whether the acknowledgement grant message delivered by the optical line terminal is received within a preset time after the second message is reported, and if the acknowledgement grant message delivered by the optical line terminal is not received within the preset time, switch the optical network unit back to a source upstream modulation format and/or a source downstream modulation format.

20. A passive optical network, comprising:
an optical line terminal, and
an optical network unit,
wherein the optical line terminal compromising: a first sending unit, configured to: subsequent to notifying the optical network unit of all upstream modulation formats and/or downstream modulation formats supported by the optical line terminal, separately deliver a registration message indicative of a registration window to the optical network unit in all supported upstream modulation formats and/or downstream modulation formats; and send a notification message to the optical network unit, wherein the notification message is used to instruct the optical network unit to switch to a target upstream modulation format and/or a target downstream modulation format; a first receiving unit, configured to receive a first message reported by the optical network unit, wherein the first message indicates the registration window satisfies a current upstream modulation format and/or downstream modulation format of the optical network unit, and comprises an upstream modulation format capability and/or a downstream modulation format capability; and a first processing unit, configured to determine the target upstream modulation format and/or the target downstream modulation format of the optical network unit according to the first message; and
wherein the optical network unit comprising: a second receiving unit, configured to: subsequent to receiving from the optical line terminal the notification of all upstream modulation formats and/or downstream modulation formats supported by the optical line terminal, receive from the optical line terminal the registration message indicative of the registration window in the upstream modulation format and/or the downstream modulation format, a second sending unit, configured to in response to the registration window satisfying the current upstream modulation format and/or downstream modulation format of the optical network unit, report the first message to the optical line terminal, wherein the first message comprises the upstream modulation format capability and/or the downstream modulation format capability; the second receiving unit being further configured to receive the notification message delivered by the optical line terminal, wherein the notification message comprises the target upstream modulation format and/or the target downstream modulation format; and a second processing unit, configured to switch an upstream modulation format and/or a downstream modulation format to the target upstream modulation format and/or the target downstream modulation format.

* * * * *